United States Patent [19]

Downing

[11] Patent Number: 4,585,268

[45] Date of Patent: Apr. 29, 1986

[54] OVERHEAD GUARD FOR LIFT TRUCKS OF DIFFERENT LENGTHS

[75] Inventor: Terry R. Downing, Glenwood, Ill.

[73] Assignee: Allis-Chalmers Corporation, Milwaukee, Wis.

[21] Appl. No.: 660,640

[22] Filed: Oct. 15, 1984

[51] Int. Cl.[4] .............................................. B62D 25/06

[52] U.S. Cl. ..................................... 296/102; 280/756

[58] Field of Search ......................... 296/102; 280/756

[56] References Cited

U.S. PATENT DOCUMENTS

| | | | |
|---|---|---|---|
| 3,455,599 | 7/1969 | Becker | 296/102 |
| 3,679,256 | 7/1972 | Orns | 296/102 |
| 3,897,960 | 8/1975 | Cosby | 296/102 |
| 3,933,371 | 1/1976 | Graham | 280/756 |

*Primary Examiner*—Robert B. Reeves
*Assistant Examiner*—Carol L. Olson
*Attorney, Agent, or Firm*—Charles L. Schwab; Arthur M. Streich

[57] ABSTRACT

An overhead guard is provided for counterweighted lift trucks of different lengths. The overhead guard has a top portion supported at its front end by a pair of laterally spaced front legs extending downwardly to attaching points on the front of the truck and the top portion is supported at its rear end by adjustably positioned laterally spaced rear posts. The top of the rear posts may be attached to different longitudinally spaced points on the upper portion of the guard and the bottom of the rear posts are attachable to support posts on the counterweight which is at different longitudinal positions on different length trucks.

4 Claims, 4 Drawing Figures

OVERHEAD GUARD FOR LIFT TRUCKS OF DIFFERENT LENGTHS

This invention relates to an overhead guard for lift trucks and more particularly to an overhead guard which will fit lift trucks of different lengths.

PRIOR ART STATEMENT

Heretofore others have provided overhead guards which can be mounted on lift trucks of different lengths. One such overhead guard is shown in U.S. Pat. Nos. 3,687,484 and 3,897,960 issued to Henry L. Cosby on Aug. 29, 1972 and Aug. 5, 1975, respectively, and entitled "Lift Truck With Overhead Board and Counterweight" and "Method and Means for Enabling Access to Vehicular Compartment", respectively. The overhead guard illustrated in the two beforementioned patents uses a pair of inverted L-shaped supports with the top horizontal portions connected to the top of the overhead guard by a connector member having a plurality of longitudinally spaced openings permitting longitudinal adjustment relative to the overhead portion of the guard. Thus, the top portion of the overhead guard can be lengthened or shortened to accommodate different lengths of trucks. A second overhead guard which is suitable for mounting on lift trucks of different lengths is shown in U.S. Pat. No. 3,933,371 issued Jan. 20, 1976 to Fredrick A. Graham for "Overhead Guard for Lift Trucks" wherein the rear support posts are secured to the rear overhead portion of the guard by a pivot pin and the leg is swingable about the pivot to attach at longitudinally different positions depending on the length of the truck. The upper end of the rear support is made nonpivoting by securing a cap screw through one of a plurality of openings in a flange which openings register with different threaded openings in the overhead portion of the guard depending on the pivoted position of the support.

SUMMARY OF THE INVENTION

The overhead guard arrangement of this invention is advantageously used in a lift truck of the type having a counterweight mounted on the rear of its frame and an operator's station forwardly of the counterweight. The overhead guard includes a generally horizontal top portion above the operator's station which is supported at its front end by a pair of laterally spaced front legs rigidly secured to the top and extending downwardly and forwardly to bottom ends detachably connected to laterally spaced points on the front of the lift truck frame. The rear of the overhead portion is supported by a pair of adjustably positioned posts, the tops of which are pinned to a pair of longitudinally extending support beams rigidly secured at their opposite ends to a pair of longitudinally spaced and transversely extending beams in the rear part of the top portion. Two laterally spaced sets of transversely aligned openings are provided in the support beams so that the posts can be pinned to the overhead portion of the guard at two different longitudinally spaced positions. The bottom ends of the rear support posts are connected to upright posts connected to laterally spaced points on the counterweight. The pin connections at the top of the posts permit the latter to swing at the bottom to different longitudinal positions for attachment to lift trucks of different lengths.

BRIEF DESCRIPTION OF THE DRAWINGS

One embodiment of the present invention is shown in the drawings in which.

DETAILED DESCRIPTION OF THE DRAWINGS

Figure 1:
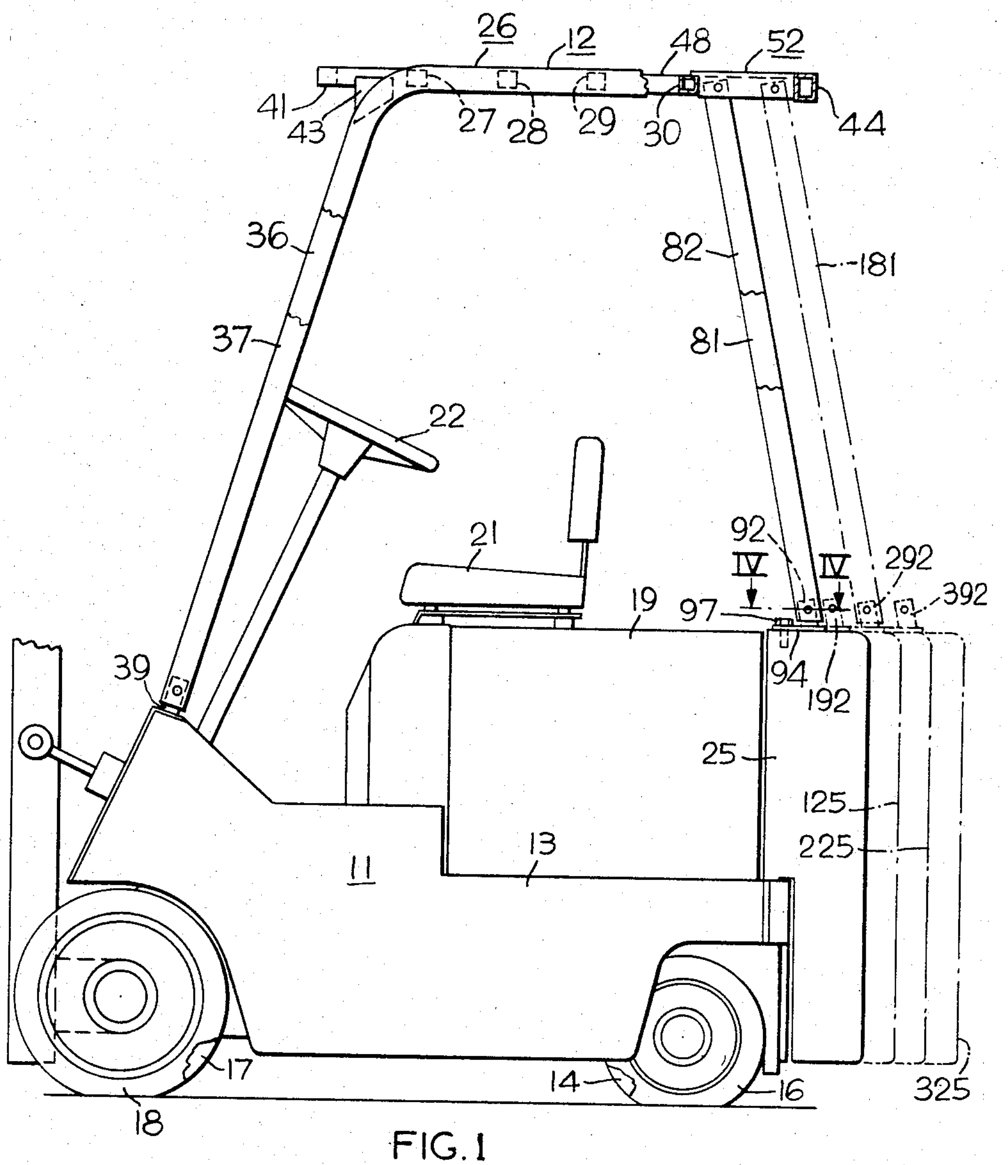
FIG. 1 is a side view of a lift truck with an overhead guard with parts broken away for illustration purposes.

Referring to the drawings, a lift truck 11 is illustrated with an overhead guard 12. The lift truck includes a frame 13 supported at its rear end by a pair of steerable wheels 14, 16 and supported at its front end by a pair of nonsteerable wheels 17, 18. The wheels 17, 18 are driven by an electric motor, not shown, which is power supplied by a battery 19. An operator's station is provided at the front end of the lift truck 11 and includes a seat 21 positioned appropriately on the frame 13 to allow the operator to steer the vehicle by operating a steering wheel 22. The overhead guard 12 includes an overhead portion or top structure 26 which includes four transverse beams 27, 28, 29, 30 welded at their opposite ends to longitudinal beams 31, 32. The longitudinal beams 31, 32 are bent so as to provide downwardly and forwardly extending portions constituting a pair of laterally spaced front support legs 36, 37 which are releasably secured at their lower ends by bolts 35 and nuts 40 to upstanding studs 38, 39 rigidly secured to laterally spaced points on the front of the lift truck frame 13.

The top or overhead portion 26 of the overhead guard 12 includes a front C-shaped beam 41 welded at its opposite rear ends to the transverse beam 27. The beam 41 is reinforced by gussets or plates 42, 43 welded at their respective opposite ends to the beam 41 and to the longitudinal beams 31, 32. Longitudinal beam 32 curves laterally inward at its rear to form a rear transverse beam 44 and, at the right side of the guard shown in the upper portion of FIG. 3, the beam 32 extends forwardly the short distance as represented by a portion 46. Portion 46 terminates short of beam 31 to thereby leave an opening 47 to accommodate use of an overhead lift chain or cable to install and remove the battery 19. A short longitudinal brace 48 is welded at its front and rear ends to the beams 29, 30, respectively.

Figure 2:
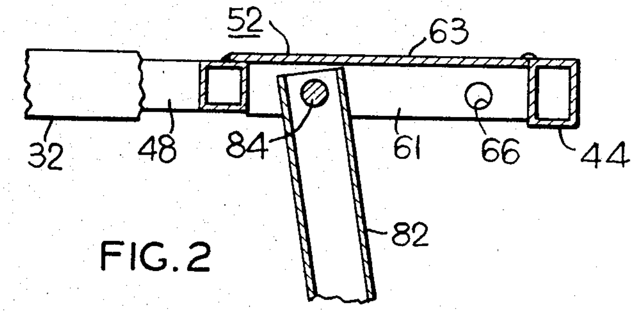
FIG. 2 is an enlarged view of an upper rear portion of the overhead guard with parts broken away for illustration purposes.
Figure 4:
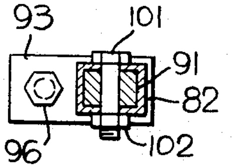
FIG. 4 is a view taken along the line IV—IV in FIG. 1.
Figure 3:
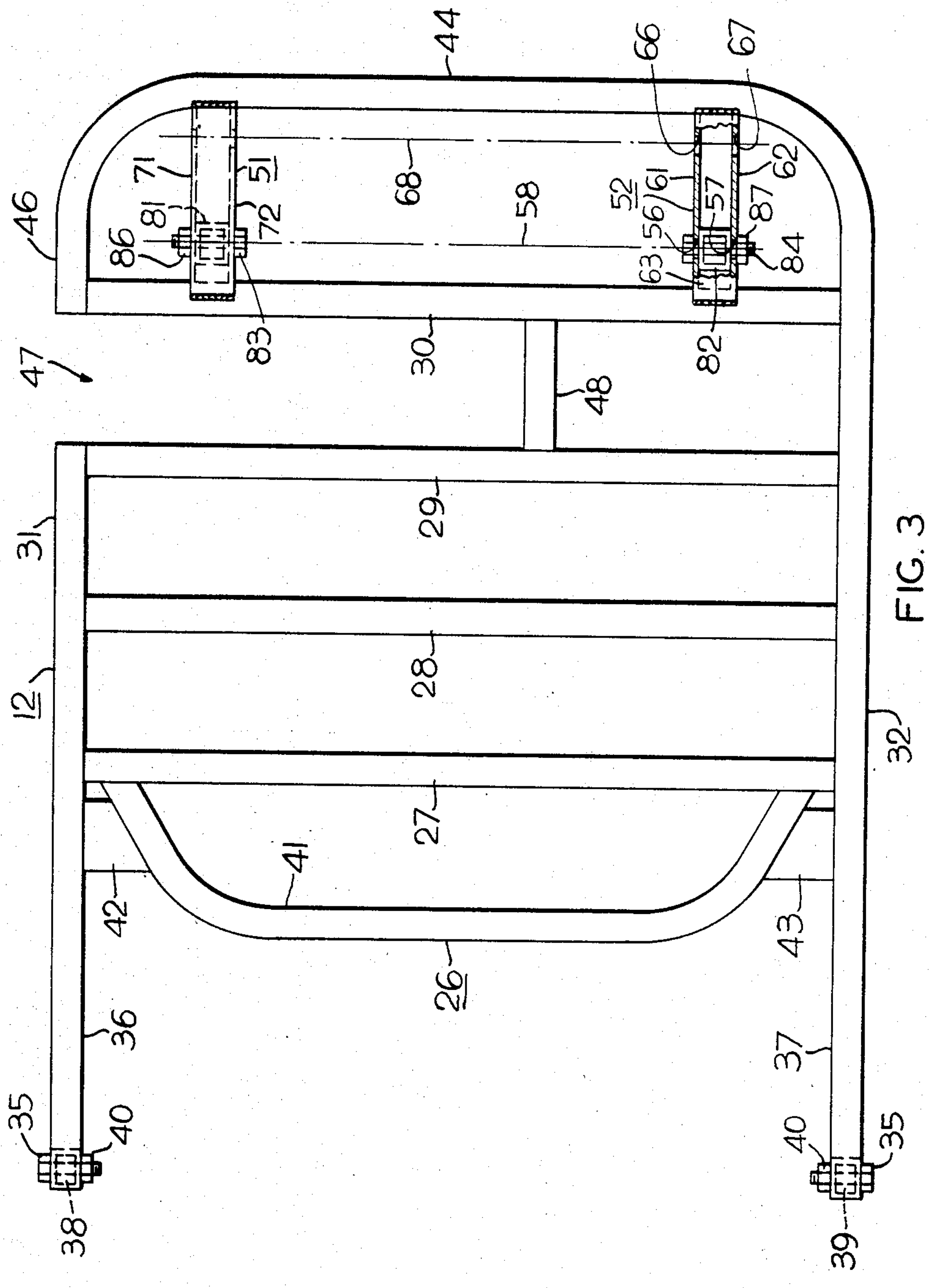
FIG. 3 is a top view of the overhead guard shown in FIG. 1 with parts broken away for illustration purposes.

A pair of downwardly opening and longitudinally extending channels 51, 52 are welded at their front ends to the transverse brace 30 and at their rear ends to the rear transverse beam 44. As shown in FIGS. 2 and 3, the channel 52 has a pair of openings 56, 57 aligned on a transverse axis 58. The openings 56, 57 are formed in flanges 61, 62 rigidly secured to and extending downwardly from a top wall or web 63 of the channel 52. Additionally, a second pair of openings 66, 67 are drilled in the flanges 61, 62 of the channel 52 on a transverse axis 68 spaced rearwardly from and parallel to the axis 58. Two sets of transversely aligned openings are drilled in the flanges 71, 72 of the channel 51 on the axes 58, 68. A pair of rear vertical support legs or posts 81, 82 are pivotally connected at their upper ends to the channels 51, 52 by transverse bolts 83, 84 and nuts 86, 87. As shown in FIG. 3, the bolt 84 extends through openings 56, 57 in the channel 52 and through aligned openings in the upper end of the hollow section post 82. The hollow posts 81, 82 are loosely fitted at their lower ends over upstanding mounting studs 91, 92 secured by welding to mounting pads 93, 94. The mounting pads 93, 94 are secured by cap screws 96, 97 to the counterweight 25 bolted to the rear of the lift truck frame 13. The posts 81, 82 are releasably connected to the studs by bolts 101 and nuts 102. One such connection is shown in FIG. 4.

By pivotally connecting the top of the posts 81, 82 to the support beams 51, 52 by pivot pins or bolts 83, 84 for swinging about transverse axis 58, the lower ends of the posts 81, 82 can be swung fore and aft. This permits connecting the lower end to a longer lift truck having a counterweight whose rear end is represented by broken lines 125 and having a pair of support studs positioned rearwardly of stud 92 as shown by broken lines 192. The overhead guard can be effectively used on a still longer lift truck by connecting the upper ends of the posts 81, 82 to the rearward parts of the support beams through use of aligned openings 66, 67 and the corresponding openings in support beam 51 aligned on axis 68. This permits the rear posts 81, 82 to occupy the rearwardly disposed positions illustrated by broken lines 181 in which position the rear posts connect to mounting studs positioned as illustrated by broken lines 292 which are mounted on a counterweight terminating on broken lines 225. This rearward pivot connection of the top of the support posts permits them to swing rearwardly at the bottom for connection to even a longer lift truck whose counterweight terminates on broken lines 325 and which carries support studs positioned as illustrated by broken lines 392.

This adjustable positioning structure for the rear support posts 81, 82 permits the posts to maintain a sufficiently upright position to afford support for the overhead guard to meet its specifications as to overhead protection for the operator and still allows a single overhead guard to be used on any one of several trucks of different lengths.

If a load dropped on the overhead guard shears the pins or bolts 83, 84 the inverted channels or support beams 51, 52 will tend to trap the upper ends of the posts 81, 82 between the walls 61, 62 and 71, 72 so as to afford additional resistance to collapse of the overhead guard. If the bolts 83, 84 shear, the top of the posts 81, 82 will bear against the underside of the top walls 63, 163 of the support beams 51, 52.

The overhead guard 12 is strengthened at the junction of the front legs 36, 37 and the overhead portion 26 by the pair of gussets 42, 43 extending downwardly and laterally from the curved front beam 41. These gussets not only add rigidity to the overhead guard but also reinforce the front beam which is cantilevered from transverse beam 27.

The embodiments of the invention in which an exclusive property or privilege is claimed are defined as follows:

1. In combination with a counterbalanced lift truck of the type having a frame supporting a counterweight at its rear end and an operator's station forwardly of the counterweight, an overhead guard arrangement comprising:

an overhead guard including
- a generally horizontal top portion above said operator's station,
- a pair of laterally spaced front legs rigidly secured to said top portion and extending downwardly and forwardly to bottom ends detachably connected to laterally spaced points on the front of said lift truck frame,
- a pair of longitudinally spaced and transversely extending beams on the rear part of said top portion, and
- a pair of longitudinally extending support beams on said top portion having corresponding front and rear ends rigidly secured to said transversely extending beams, respectively, said support beams each including a top wall, laterally spaced vertical side walls secured to and extending downwardly from said top wall, and front and rear longitudinally spaced sets of transversely aligned openings formed in said side walls, said support beams being downwardly open between said side walls adjacent said aligned openings to receive support posts,
- a pair of laterally spaced generally upright support posts connected at their bottom ends to laterally spaced points on said counterweight and
- a pair of horizontal pin means connecting the upper ends of said support posts to said laterally spaced vertical side walls of said support beams and spaced beneath said top walls, respectively, said pin means extending through corresponding sets of said openings in said side walls of said support beams, whereby an accidental dropping of a load on the overhead guard that shears a said pin means will cause the overhead guard to drop only until the top wall over the sheared pin engages the top of the post beneath the sheared pin.

2. The combination of claim 1 and further comprising means permitting longitudinal repositioning of said support posts on said lift truck.

3. The combination of claim 2 wherein said pair of pin means permit the bottom ends of said posts to swing in a fore and aft direction to accommodate repositioning of the lower ends of said support posts.

4. The combination of claim 1 wherein said support beams have front and rear sets of aligned openings permitting the upper ends of said support posts to be optionally connected to front or rear parts of said support beams.

* * * * *